(12) United States Patent
Furuuchi et al.

(10) Patent No.: US 11,312,281 B2
(45) Date of Patent: Apr. 26, 2022

(54) CLIP FOR ATTACHMENT OF FLOOR CARPET

(71) Applicant: NIFCO INC., Yokosuka (JP)

(72) Inventors: Suguru Furuuchi, Yokosuka (JP); Takuya Hamamoto, Yokosuka (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 17/188,488

(22) Filed: Mar. 1, 2021

(65) Prior Publication Data

US 2021/0291714 A1    Sep. 23, 2021

(30) Foreign Application Priority Data

Mar. 23, 2020 (JP) .............................. JP2020-050559

(51) Int. Cl.
*B60B 3/04* (2006.01)
*B60N 3/04* (2006.01)

(52) U.S. Cl.
CPC .............. *B60N 3/046* (2013.01); *B60N 3/044* (2013.01)

(58) Field of Classification Search
None
See application file for complete search history.

(56) References Cited

U.S. PATENT DOCUMENTS 5,775,859 A    7/1998  Anscher

FOREIGN PATENT DOCUMENTS

| EP | 2502783 A1 * | 9/2012 | ............ B60N 3/046 |
|---|---|---|---|
| FR | 2970446 A1 | 7/2012 | |
| JP | 2011-195071 A | 10/2011 | |
| JP | 6351163 B2 | 7/2018 | |

OTHER PUBLICATIONS

Machine ranslation of EP2502783A1 (Year: 2021).*
Europe Patent Office, "Search Report for European Patent Application No. 21160893.0," dated Jul. 14, 2021.

* cited by examiner

*Primary Examiner* — Alexander S Thomas
(74) *Attorney, Agent, or Firm* — Manabu Kanesaka

(57) ABSTRACT

A clip for attachment of a floor carpet includes a male member having a lower flange portion, and a shaft portion projecting from the lower flange portion; and a female member having a cylindrical portion to which the shaft portion is inserted, an upper flange portion projecting around an outer periphery of the cylindrical portion, and an engaging portion at an inner periphery of the cylindrical portion. The male member also includes a hole portion penetrating through the lower flange portion and the cylindrical portion, engaging projections formed around an outer periphery of the shaft portion, and a regulation member inserted into the hole portion. In case the male member is inserted into the female member to engage the engaging projections with the engaging portion and the regulation member is inserted into the hole portion, the regulation member prevents the engaging projections from being disengaged from the engaging portion.

6 Claims, 11 Drawing Sheets

CLIP FOR ATTACHMENT OF FLOOR CARPET

BACKGROUND OF THE INVENTION AND RELATED ART STATEMENT

The present invention relates to a clip for attachment of a floor carpet, which is attached to a floor carpet and fixings an article, such as a floor mat and so on, mounted on the floor carpet.

FIGS. 11(a) and 11(b) show a structure disclosed in Patent Document 1, wherein FIG. 11(a) show a relation among a female member (cap member) 5 forming a clip for attachment of a floor carpet, a male member (pin member) 4, and a mat cap 6 fixing the floor mat 1 to the female member 5, and FIG. 11(b) shows a using condition wherein the mat cap 6 is fixed to the female member 5. The male member 4 comprises a lower flange portion 4a arranged under a floor carpet 3, a shaft portion 4b having a cylindrical shape with a bottom, the shaft portion 4b being formed to project on an upper surface of the lower flange portion and penetrating through an insertion hole 3a formed in the floor carpet, a pair of elastic engaging pieces 7 separated by slits in the shaft portion 4b, and engaging projections 7a provided on an outer periphery of the respective elastic engaging pieces 7. The female member 5 comprises a cylindrical portion 5b to which the shaft portion 4b is inserted, an upper flange portion 5a formed to project on an outer periphery of the cylindrical portion 5b, peripheral grooves 8 provided on an inner periphery of the cylindrical portion and engaging the engaging projections 7a, and a small diameter flange portion 5c provided on the upper periphery of the cylindrical portion.

In the clip structure, the shaft portion 4b is penetrated into an insertion hole 3a provided in the floor carpet 3 from the lower side of the hole to the upper side of the hole, the peripheral grooves 8 of the cylindrical portion 5b are engaged with the engaging projections 7a of the elastic engaging pieces 7, which are the projections of the shaft portion penetrated, so that the clip structure is mounted on the floor carpet in the condition such that the floor carpet 3 is sandwiched between the lower flange portion 4a and the upper flange portion 5a. And, the floor mat 1 mounted on the floor carpet is fixed using the cylindrical portion 5b at the female side. Namely, the mat cap 6 shown in the drawings comprises a cylindrical body portion 6a arranged in the insertion hole 1a formed in the floor mat 1 and inserted into the cylindrical portion 5b of the female member, upper and lower flange portions 6b, 6c formed at the outer peripheral upper and lower portions of the cylindrical body portion and sandwiching the floor mat 1 from the upper and lower sides, a pair of engaging pieces 9 separated by slits and formed at the cylindrical body portion 6a, and engaging projecting portions 9a formed at the inner upper side of the respective engaging pieces and engaging the small flange portion 5c of the female member.

PATENT DOCUMENT

Patent Document 1: Japanese Patent Publication 2011-195071

Problems to be Solved by the Invention

In case of removing the floor mat from floor carpet in a using condition as shown in FIG. 11(b) using the clip for attachment of the floor carpet, when the floor mat is pulled in a direction away from the floor carpet, the engaging projecting portions at the mat cap engage-release relative to the small diameter flange at the female member with elastic displacement in the enlargement direction of the engaging pieces. However, in this operation, it may happen that the female member is disengaged together with the mat cap due to a large pulling force for the floor mat or, depending on the pulling direction, disengaging the peripheral groove of the female member from the engaging projecting portions of the male member. Also, in the operation of inserting the shaft portion at the male side to the cylindrical portion at the female side to engage the engaging projecting portions to the peripheral groove, it requires a large shaft insertion force because the shaft portion or the elastic engaging pieces are hardly displaced in the diameter reduced direction, so that operation ability is not good.

Accordingly, an object of the invention is to provide, while solving the problems as explained above, a clip for attachment of the floor carpet, formed of a female member and a male members, to which high removing force is provided, and to prevent a possibility of accidental disengagement of the female member together with a product, such as a floor mat, from the male member.

Other objects and advantages of the invention will be disclosed in the following explanation.

Means for Solving the Problems

In order to attain the object, a first aspect of the invention is to provide a clip for attachment of a floor carpet, comprising a male member having a lower flange portion, and a shaft portion projecting from an upper surface of the lower flange portion; and a female member having a cylindrical portion to which the shaft portion is inserted, and an upper flange portion projecting around an outer periphery of the cylindrical portion. The clip is configured to be attached to the floor carpet and held between the lower flange portion and the upper flange portion by inserting the shaft portion to an insertion hole formed in the floor carpet from a hole lower side to a hole upper side and engaging the shaft portion penetrating through the insertion hole with the cylindrical portion so that an article mounted on an upper surface of the floor carpet is fixed by the cylindrical portion of the male member.

The female member includes an engaging portion at an inner periphery of the cylindrical portion. The male member includes a hole portion penetrating through the lower flange portion and the cylindrical portion in an axial direction, engaging projections formed around an outer periphery of the shaft portion to project therefrom, and a regulation member to be inserted into the hole portion, the regulation member, in case the male member is inserted into the female member to engage the engaging projections with the engaging portion and the regulation member is inserted into the hole portion, preventing the engaging projections from being disengaged from the engaging portion.

The above invention is preferably made according to the following aspects.

(a) In a second aspect of the invention, a clip according to the first aspect has a structure such that the shaft portion of the male member includes a plurality of divided shaft pieces divided by the hole portion.

(b) In a third aspect of the invention. a clip according to the first or second aspect has a structure such that the male member further includes a hinge bendably connecting the regulation member to the lower flange portion.

(c) In a fourth aspect of the invention, a clip according to the first or second aspect has a structure such that the male member further includes a connecting piece bendably connecting the regulation member to the lower flange portion.

(d) In a fifth aspect of the invention, a clip according to any one of the first to fourth aspects has a structure such that the regulation member includes a claw engaging an engaging portion formed at the lower flange portion of the male member.

(e) In a sixth aspect of the invention, a clip according to the fifth aspect has a structure such that the engaging portion is defined by an edge portion of the hole portion and a plurality of slits extending from the hole portion. Incidentally, the number of the slits is generally two according to the embodiment, but it is considered that another slit may be provided between the two slits. Thus, the number of the slits is defined as plural.

(f) In a seventh aspect of the invention, a clip according to any one of the first to sixths aspects has a structure such that the shaft portion of the male member includes the engaging projections arranged in the axial direction, and the cylindrical portion of the female member includes a lower projecting portion projecting downwardly from a lower surface of the lower flange portion and having the engaging portion on an inner periphery thereof.

Advantages of the Invention

In the first aspect of the invention, as compared with the structure shown in Patent Document 1, the male member includes the lower flange portion, the hole portion penetrating through the shaft portion in the axial direction, and the engaging projections projecting from the outer periphery of the shaft portion. When the regulation member is inserted into the hole portion as shown in FIGS. 5(a) and 5(b) and 7(a)-7(c) from a condition that the engaging projections of the male member are elastically engaged with the engaging portions formed at the inner periphery of the cylindrical portion of the female member as shown in FIGS. 4(a) and 4(b), the displacement of the shaft portion in the diameter reducing direction is prevented. Accordingly, the engagement-release of the engagement projections at the male side to the engage members at the female side is disabled, so that even if an outer force is applied, the attachment condition of floor carpet can be stably maintained.

In the second aspect of the invention, since the shaft portion of the male member is divided into the plurality of shaft pieces divided by the insertion hole, the shaft pieces can be easily reduced in diameter in the course of insertion of the shat pieces into the cylindrical portion of the female member, to thereby reduce the insertion force of the shaft portion to the cylindrical portion. Thus, assembly operation to the floor carpet can be improved.

In the third aspect of the invention, since the regulation member is bendably connected to the lower flange portion of the male member through the thin hinge, as compared to a structure where the regulation member is separately formed with respect to the male member, management or handling of the clip is superior. Also, when the regulation member is not completely inserted, an incomplete insert condition can be detected according to the condition of the thin hinge by eyes or a sensor. Thus, incorrect assembly can be easily prevented.

In the fourth aspect of the invention, since the regulation member is bendably connected to the lower flange portion of the male ember by the bendable connecting piece, as in the third aspect, the management is superior and can be made light as in the structure of the third aspect.

In the fifth aspect of the invention, since the regulation member includes the claw engaging the engaging portion formed at the lower flange portion of the male member, it is possible to keep the insertion condition into the hole of the shaft portion by the engagement of the claw to the engagement portion.

In the sixth aspect of the invention, since the engagement portion is defined by the edge portion of the hole portion and the plurality of slits extending from the hole portion, as shown in FIGS. 1 and 10(a)-10(c), the engagement portion is made easily. Also, since the claw can be engaged with the engagement portion with a click feeling at the final situation where the regulation portion is inserted into the hole portion, assembly operation is superior.

In the seventh aspect of the invention, the shaft portion of the male member includes the engaging projections arranged in the axial direction, and the cylindrical portion of the female member includes the lower projecting portion projecting downwardly from the lower surface of the lower flange portion and having the engaging portion on the inner periphery thereof. Thus, as shown in FIGS. 8(a)-8(c), it is possible to respond even if the thickness of the floor carpet is changed, and the clip is superior in the thickness absorbing ability.

BRIEF DESCRIPTION OF THE DRAWINGS

FIGS. 9(a)-9(d) show upper and lower holding parts forming the above holding member, wherein FIG. 9(a) is a front view showing a relation of the upper and lower holding parts, FIG. 9(b) is a bottom view of the upper holding part, FIG. 9(c) a plan view of the lower holding part, and FIG. 9(d) is a sectional view of the holding member where the upper and lower holding parts are engaged.

FIGS. 10(a)-10(c) show the male member forming the clip, wherein FIG. 10(a) is a plan view, FIG. 10(b) is a front view, and FIG. 10(c) is a plan view of a modified example in a condition similar to FIG. 10(a).

EMBODIMENTS OF THE INVENTION

Figure 1:
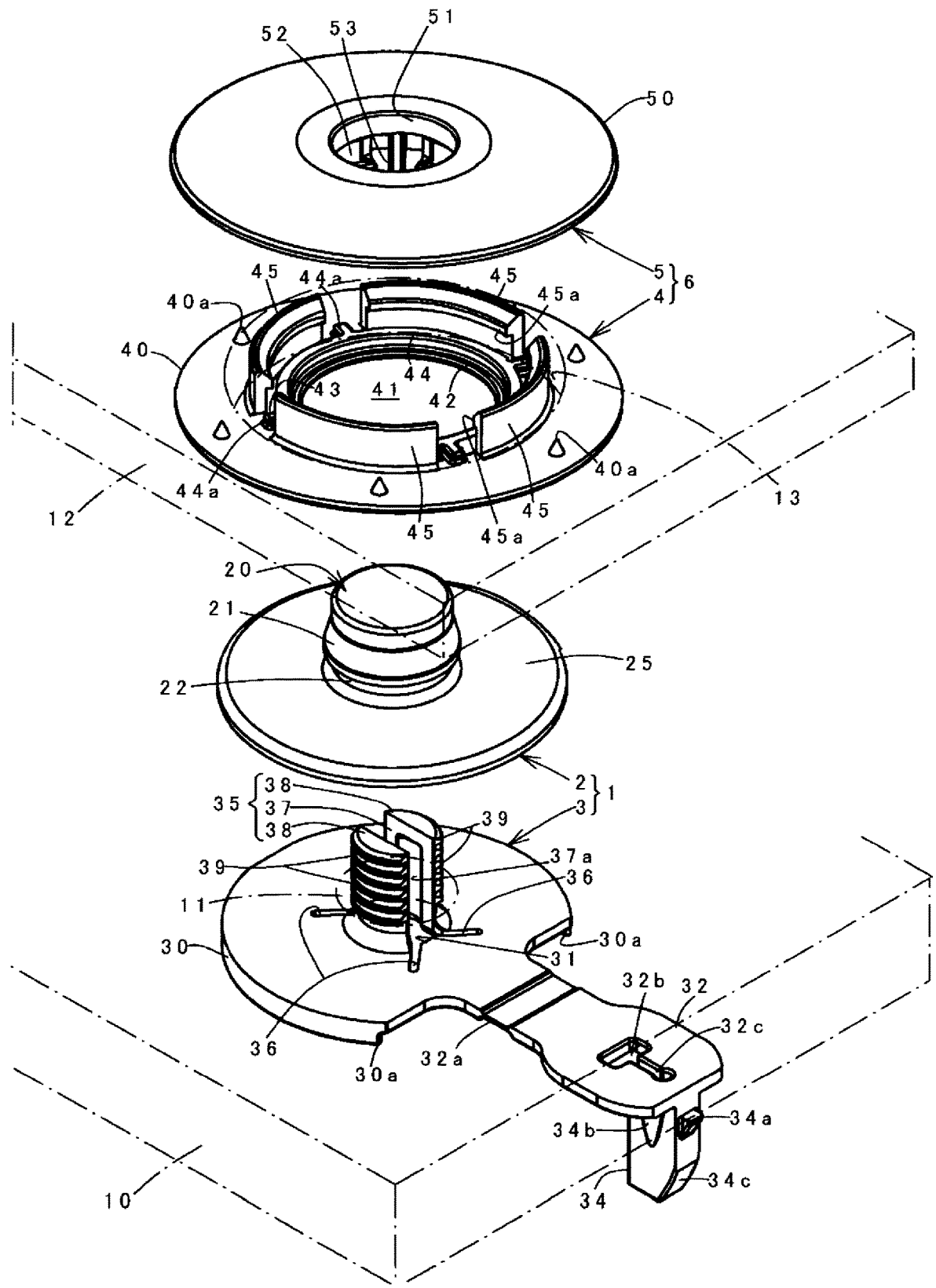
FIG. 1 is an exploded perspective view for showing a clip for attachment of a floor carpet according to an embodiment of the invention, and a holding member for a floor mat attachment engaged with the clip.
Figure 2A:
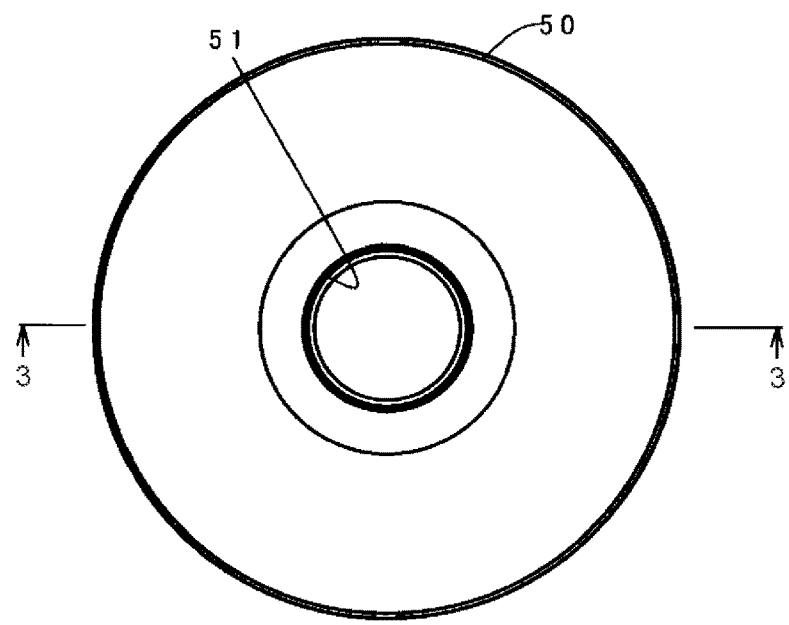
FIG. 2(a) is a plan view for showing the clip and the holding member as shown in FIG. 1 together with the floor carpet and the floor mat.
Figure 2B:
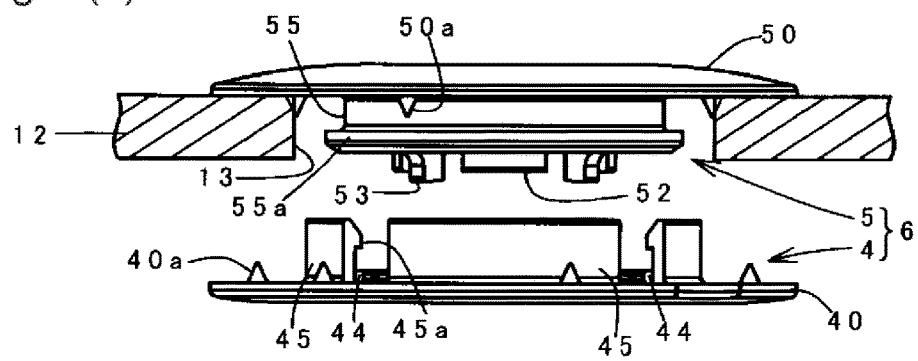
FIG. 2(b) is a side view thereof.
Figure 2B:
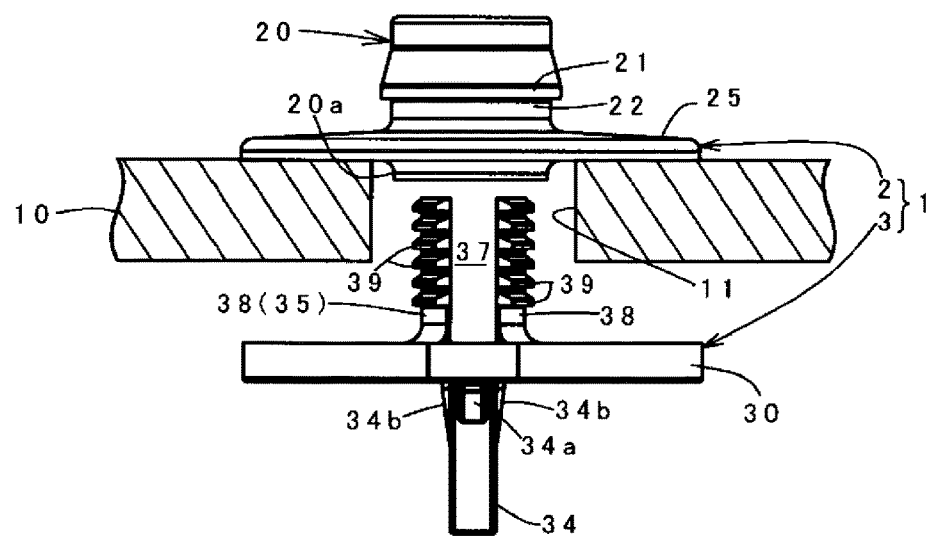

Hereinafter, the embodiments of the invention are explained with reference to the drawings. In this explanation, a structure of a clip for attachment of a vehicle floor carpet and an operational characteristic thereof, a structure of a holding member for attachment of a floor mat and an operational characteristic thereof, a relation between the clip and the holding member, namely a connection structure between the clip and the holding member for attaching the floor mat to the floor carpet, and a modified example, are explained.

(Structure of the Clip) A clip 1 for attachment of a floor carpet of the embodiment comprises a female member 2 having a cylindrical portion 20, an upper flange portion 25 projecting from an outer periphery of the cylindrical portion 20, and engagement portions 26, 27 provided on an inner periphery of the cylindrical portion 20; and a male member 3 having a lower flange portion 30, a shaft portion 35 projecting from an upper surface of the lower flange portion 30 and inserted into the cylindrical portion 20, and an engagement projecting portion 39 projected on an outer periphery of the shaft portion 35. The shaft portion 35 is penetrated through an insertion hole 11 provided in a vehicle floor carpet 10 from a hole lower side to an hole upper side, and by engaging the cylindrical portion 20 with a projecting portion of the shaft portion 35 penetrated through, the clip 1 is attached to the floor carpet 10 in a condition that the floor carpet 10 is sandwiched between the lower flange portion 30 and the upper flange portion. Also, in the clip 1, the floor mat 12 mounted on the upper surface of the floor carpet is engaged and fixed by using the cylindrical portion 20 of the female member and the engaging pieces 52 provided on an upper holding member 5 forming the floor mat holding member 6.

The main points of the invention are a structure that the male member 3 includes a hole portion 37 penetrating in an axial direction through the lower flange portion 30 and the shaft portion 35, a structure that the shaft portion 35 is divided into a plurality of swingable shaft pieces 38 by the hole portion 37, a structure that the male member 3 includes a regulation member 34 preventing the engagement projecting portion 39 from relaxing in the direction of releasing the engaging portions 26, 27 when the male member 3 is inserted into the hole portion 37 in a condition of the male member 3 with respect to the female member 2 such that the engaging projections 26, 27 of the cylindrical portion are elastically engaged with the engagement projections 39 of the shaft portion, and a structure that the regulation member 34 includes a claw portion 34a engaging the elastic engaging portion 31 provided at the lower flange portion 30. Hereunder, the detailed structure is explained. Incidentally, the female member 2, the male member 3, the lower holding member 4, the upper holding member 5 are all made of resin molded articles, but they may be made of other materials.

Figure 3:
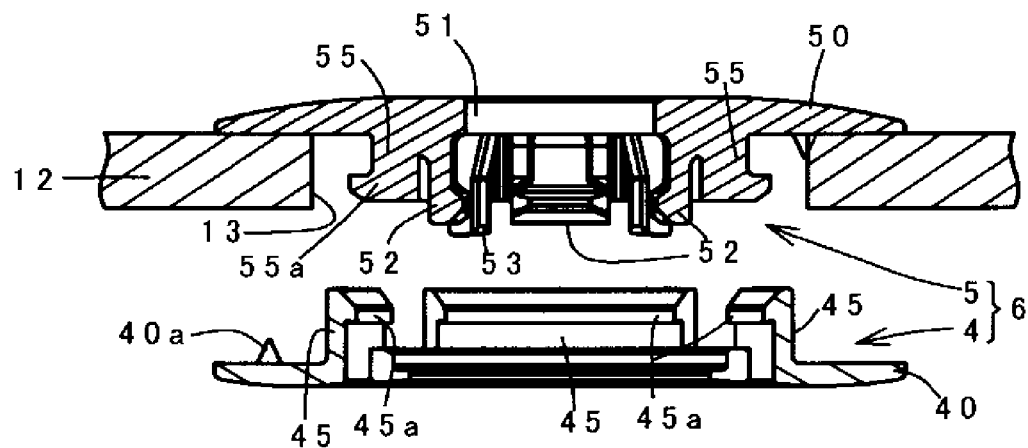
FIG. 3 is a sectional view taken along a line 3-3 in FIG. 2(a).
Figure 3:
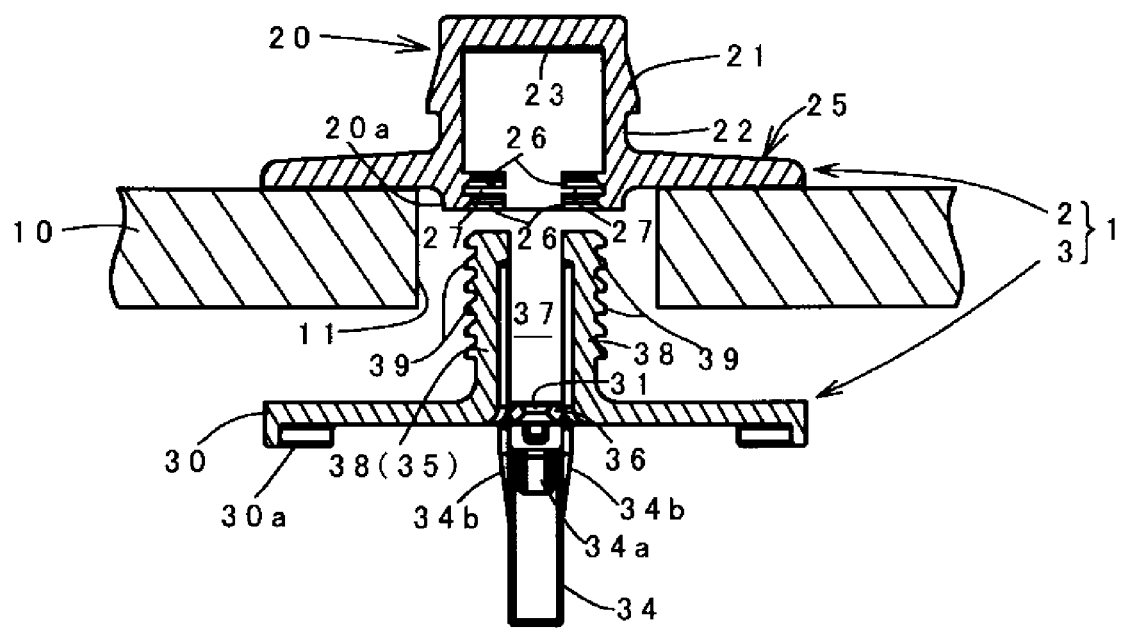
Figure 5A:
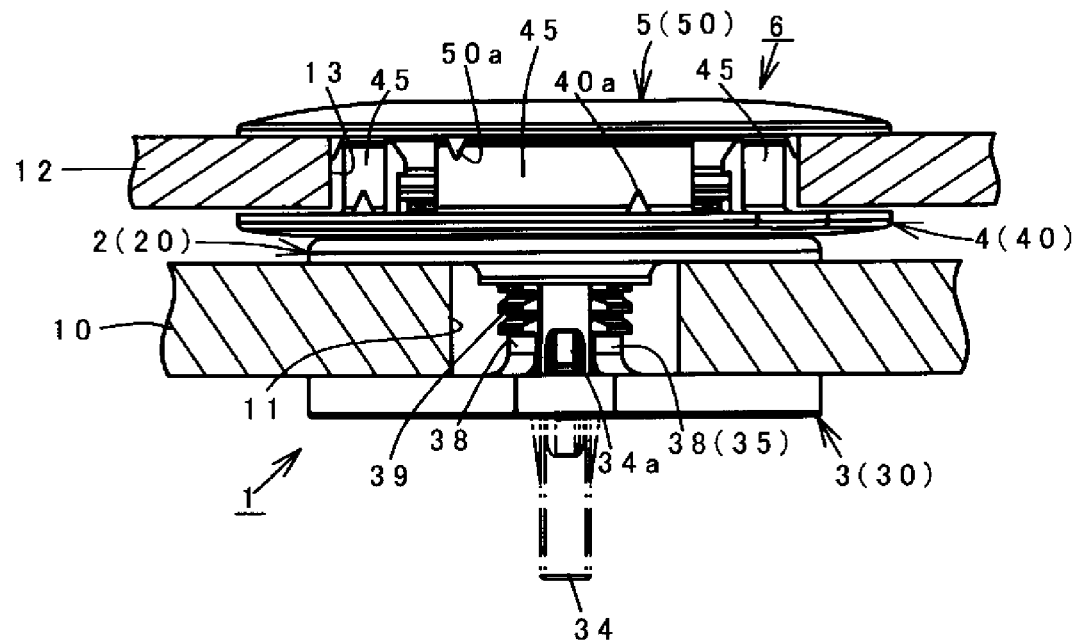
FIGS. 5(a) and 5(b) are a front view and a sectional view in a condition wherein the floor carpet as shown in FIGS. 3(a) and 3(b) is attached to the floor mat by an engagement of the clip and the holding member.
Figure 5B:
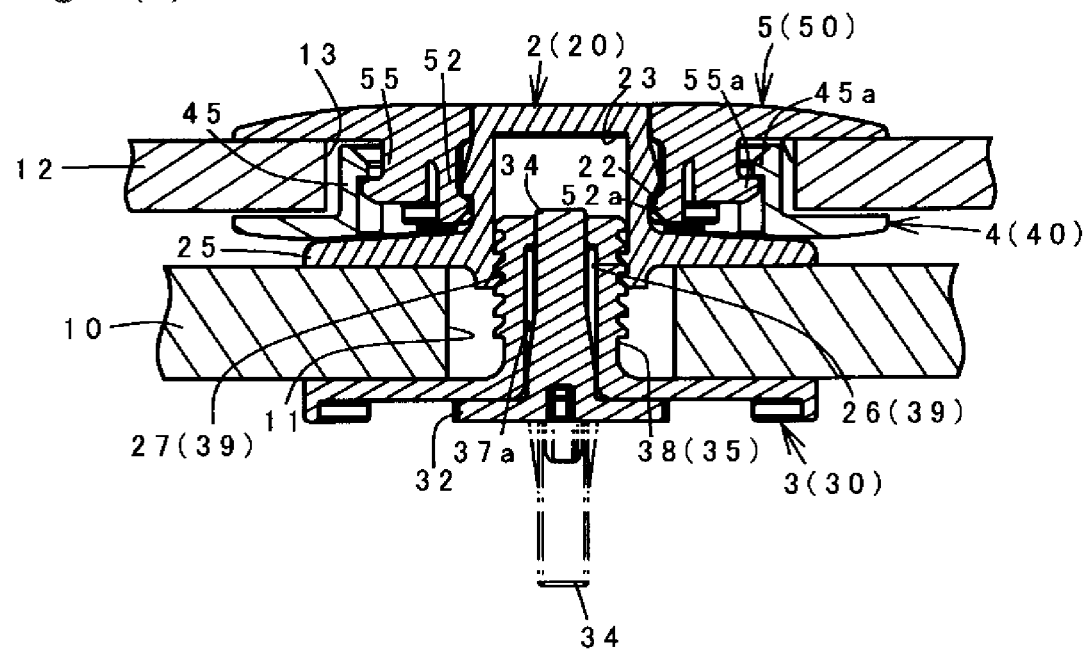

Here, in the female member 2 forming the clip 1, the upper flange 25 has generally a disc shape and abuts against an upper surface of the floor carpet 10. The cylindrical portion 20, as shown in FIGS. 3, 5(a) and 5(b), has an inverse cylindrical shape with a bottom closing the upper end, a height with a size slightly greater than a thickness of the floor mat 12, and includes the engaging portions 26, 27 formed on an inlet inner periphery of the inside 23, and an engagement portion 22 on an outer periphery at a base side. Also, the cylindrical portion 20 includes a lower projecting portion 20a projecting slightly downwardly from a lower surface of the flange portion 25, the lower projecting portion 20a forms an inlet of the cylindrical portion, and the engaging portions 26, 27 are provided at an inner periphery of the lower projecting portion 20a.

Figure 8A:
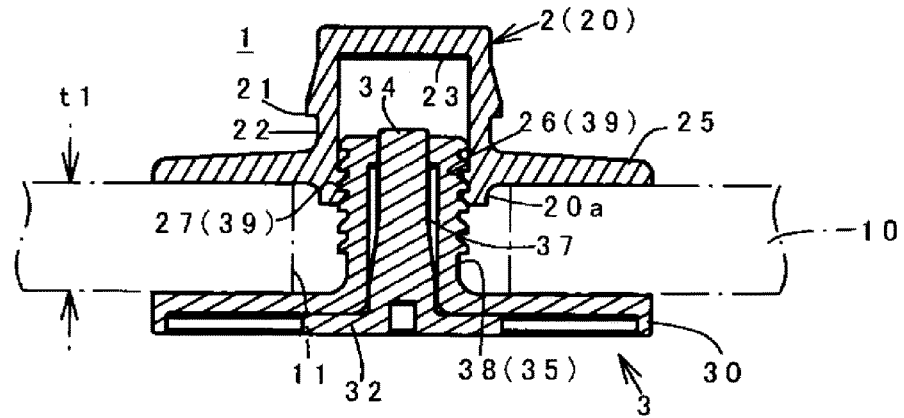
FIG. 8(a) is a sectional view of 8(a)-8(a) in FIG. 7(a) in the permanent fixing condition of the male member relative to the female member.
Figure 8B:
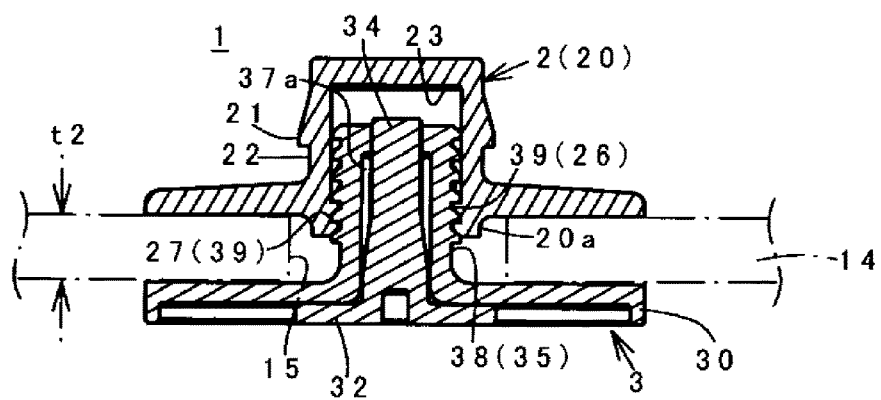
FIGS. 8(b) and 8(c) are views showing thickness size absorbing operations in section, similar to FIG. 8(a), showing two examples changing the thicknesses of the floor carpets.
Figure 8C:
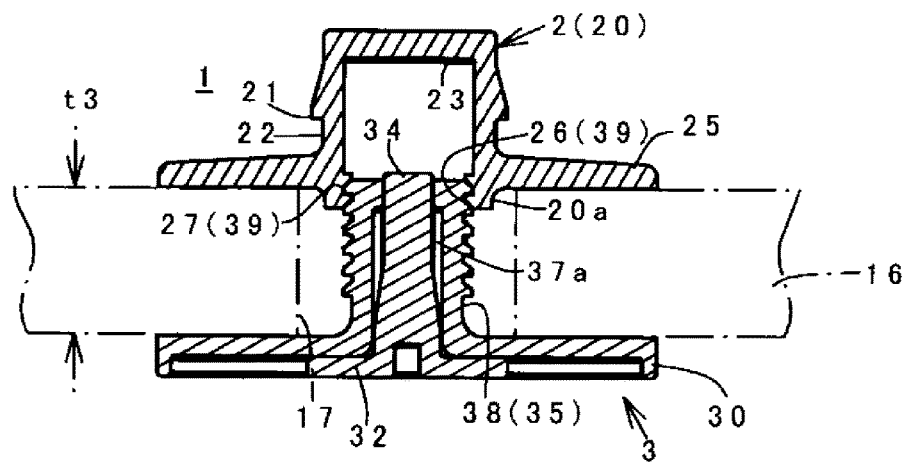

The engaging portion 26 has a mounting shape, and the engaging portion 27 has a dented shape between the engaging portions 26, The lower projecting portion 20a is effective in thickness absorbing operation of the carpet as shown in FIGS. 8(a)-8(c) by locating the engaging portions 26, 27 lower than the flange portion 25. On the other hand, the engaging portion 22 is located on a base side of the cylindrical portion 20, and has a dented shape by the large diameter portion 21 formed at the upper side thereof. The large diameter portion 21 has an inclined surface with a projecting amount greater as it goes from the upper side to the lower side. The large diameter portion 22 is engaged, as explained later, when a claw 52a of the engaging piece 52 formed at the upper holding member 5 elastically rides over the large diameter portion 21 (FIGS. 5(a) and 5(b)).

In the male member 3, the shaft portion 35 is divided into a pair of shaft pieces 38 by the hole portion 37 in the slit shape from the lower flange portion 30 to the shaft upper end in the axial direction. The shaft pieces 38 face with a predetermined interval corresponding to the size of the hole portion 37 and form a reduced thickness portion 37a further reduced in thickness at portions facing each other. Also, each shaft piece 38 has a half cylindrical shape, and includes a plurality of engaging projections 39 on an outer periphery of the arc shape. Namely, the engaging projections 39 are formed from the base of the shaft piece 38 to the upper end with an equal space therebetween.

The lower flange portion 30 has a disc shape generally equal to the upper flange 25, and is located under the flower carpet 10. Also, the lower flange 30 includes a pair of engaging portions 31 provided to face each other and located at a portion corresponding to the hole portion 37, a connecting piece 32 provided to be bent through a thin hinge 32a, and a regulation member 34 projecting from the thin hinge 32a. In a lower surface of the flange portion 30, as shown in FIGS. 3 to 5(b), a peripheral portion 30a except a portion integral with the connecting piece 32 is formed to be high, so that the engaging piece 32 is located inside the peripheral portion 30a.

Figure 7A:
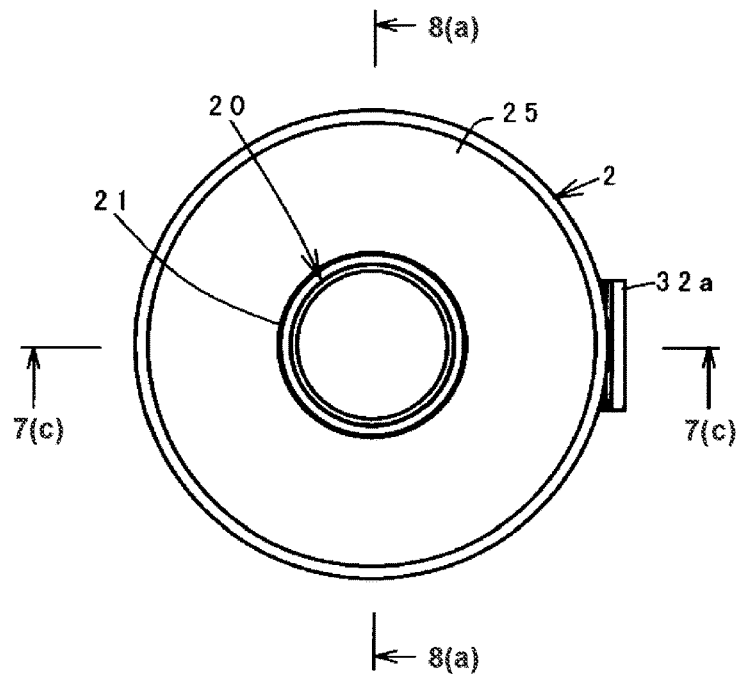
FIGS. 7(a), 7(b) and 7(c) are a plan view, a front view and a sectional view taken along a line 7(c)-7(c) in FIG. 7(a), showing a permanent fixing condition of the male member relative to the female member.
Figure 7B:
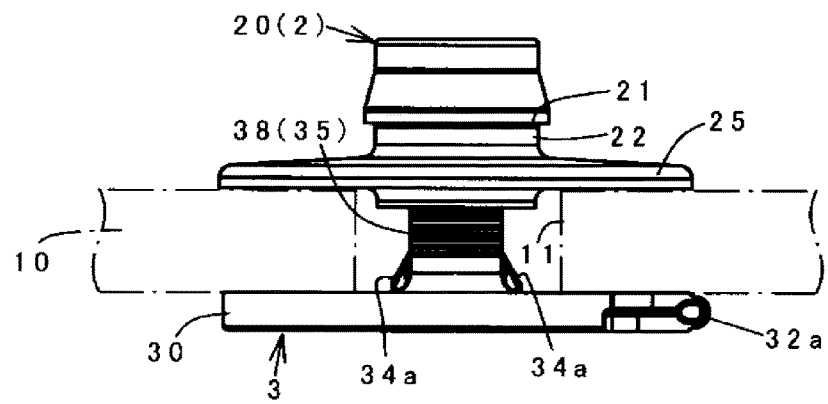
Figure 7C:
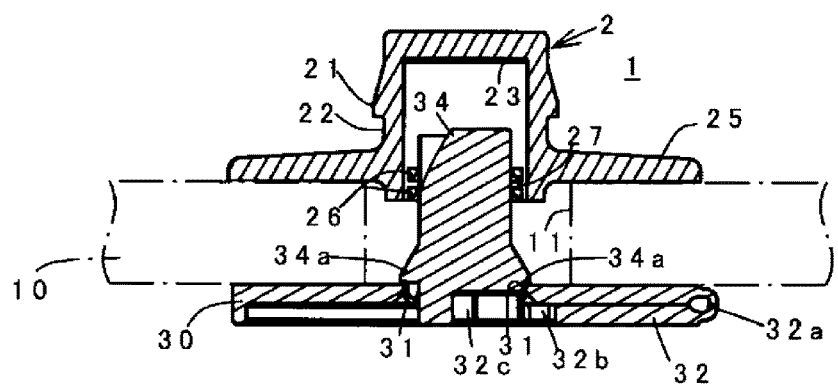

The engaging portions 31 are located in the lower flange portion 30, and are formed to be bendable in the up-down direction, each being defined by an edge of the hole portion 37 and two slits 36 extending outwardly from the hole portion 37. When the connecting piece 32 is bent around the thin hinge 32a and is located under the lower surface of the lower flange, the connecting piece 32 is retained in a plane inside the peripheral portion 30a of the lower flange 30. The regulation member 34 has a plate shape with about a rectangular shape which can be inserted into the hole portion 37, as shown in FIGS. 1 and 7(c), and includes claws 34a formed to project at an outer surface and an inner upper side of an inner face facing the outer surface, extending portions 34b projecting on two upper sides and provided to increase an projecting amount as it goes upward from a lower side, and an inclined portion 34c. And, when the regulation portion 34 is inserted into the hole portion 37 while bending through the connecting piece 32 and the thin hinge 32a, the regulation portion 34 passes while elastically displacing the engaging portions 31 corresponding to the claws 34a and engages the engaging portions 31a at the same time of passing through. Incidentally, numeral 32b is a hole for molding to form the claws 34a provided at an inner surface of the regulation portion 34, and numeral 32c is an indent formed on an upper side of the regulation portion 34.

(Operation characteristic of the clip) Next, an attachment operation for mounting the clip 1 to the floor carpet 10 is explained.

(1) In this initial operation, for example, as shown in FIG. 3, after the flange portion 25 of the female member is placed on the upper face of the floor carpet 10 of a vehicle, the shaft pieces 38 forming the shaft portion of the male member is penetrated into the insertion hole 11 from a hole lower side to the hole upper side. Namely, the shaft pieces 38 are inserted to the insertion hole 11 until the lower flange portion 30 abuts against the lower surface of the floor carpet 10. In this procedure, the engaging portions 26, 27 accept the shaft pieces 38 in the inside 23 while engaging with and disengaging from the plurality of engaging projections 39 at the upper side. Finally, as shown in FIG. 4, the engaging portions 27 in the dent shape engage the engaging projections 39 located at the corresponding portions, and the engaging portions 26 in the projecting shape engage dent portions between the engaging projections 39. In this engaging operation, since the respective shaft pieces 38 divided by the hole portion 37 can be easily elastically deformed in the diameter reducing direction, it is possible to insert at the weak insertion force as compared with the conventional structure.

Figure 6A:
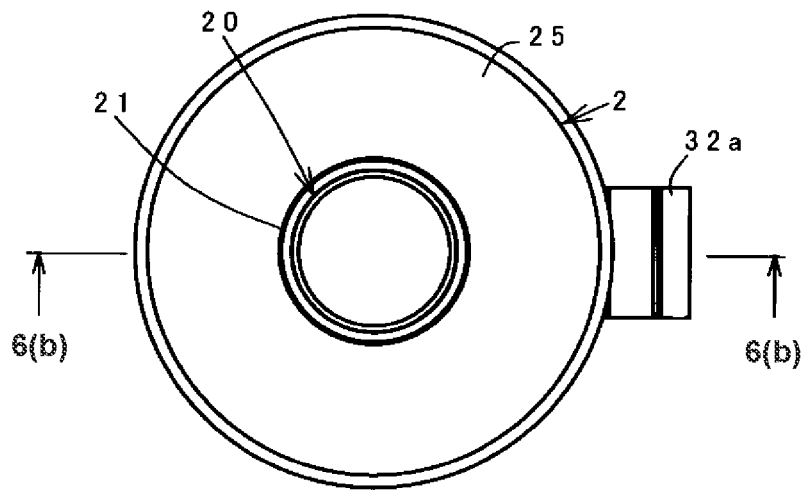
FIGS. 6(a), 6(b) and 6(c) are a plan view, a front view and a sectional view taken along a line 6(b)-6(b) in FIG. 6(a), showing a temporary fixing condition of the male member relative to the female member.
Figure 6B:
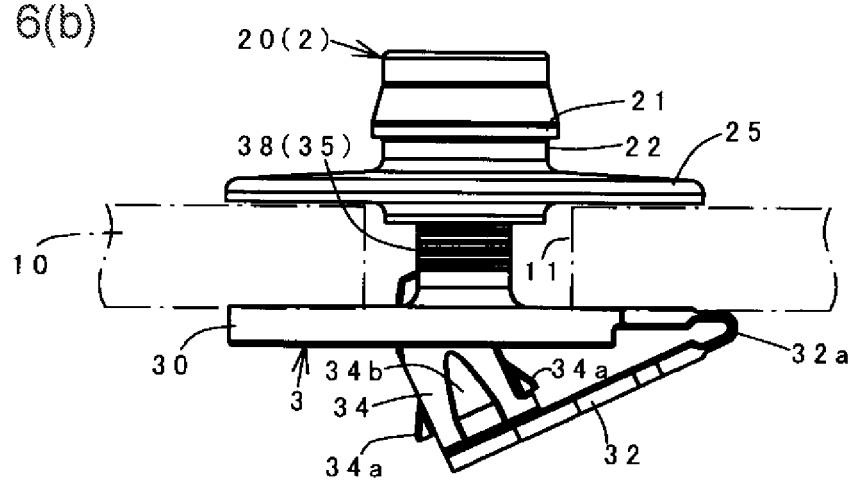
Figure 6C:
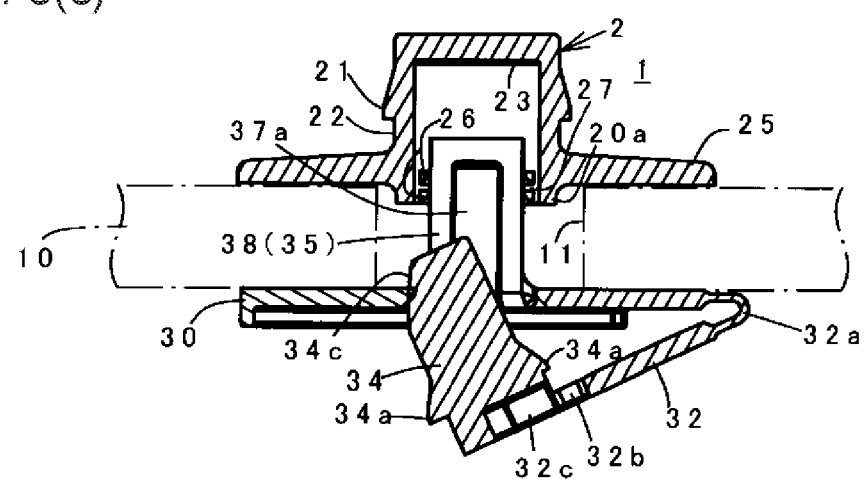

(2) In this structure, by bending the connecting piece 32 through the thin hinge 32a from the engaging condition of the engaging projections 39 of the shaft pieces and the engaging portions 26, 27 of the cylindrical portion to the lower flange 30 side, as shown in FIGS. 6(a)-6(c) and FIGS. 7(a)-7(c), the regulation portion 34 is inserted into the hole portion 37. In this procedure, when the connecting piece 32 is bent around the thin hinge 32a, as shown in FIG. 6(c), the front end of the regulation portion 34 is inserted into the hole portion 37 of the lower flange and contacts the engaging portions 31 at the side corresponding thereto. Then, after the inclined portion 34c slidably passes through the engaging portions 31, as shown in FIG. 7(c), when the connecting piece 32 contacts the lower surface of the lower flange portion 30, the claws 34a pass through engaging portions 31 while swinging movements, and the regulation portion 34 engages the engaging portions 31 right after passing through. At that time, the engaging portions 31 generate clicking sound by the elastic displacement, so that it is possible to notice the completion of the engagement of the claws 34a to the corresponding engaging portions 31. The extending portions 34b fit into the reduced thickness portions 37a to thereby stably hold the engagement of the regulation portion 34. As a result, in this structure, the engagement-release of the engaging projections 39 at the male side relative to the engaging portions 26, 27 is prevented by the regulation portion 34, so that the male and female members provide high connection force, and floor carpet mounting condition can be stably held even if the outside force is applied.

(3) In addition, the engaging portions 26, 27 can engage desired engaging projections among the plurality of engaging projections 39 on the shaft pieces 38. Therefore, even if the thicknesses t1-t3 of the floor carpet 10 is changed, as shown in FIGS. 8(a)-8(c), the clip can be used. Actually, assuming that the thickness t1 of the floor carpet in FIG. 8(a) is a standard, in case of the floor carpet t2 which is thinner in thickness than the carpet t1, as shown in FIG. 8(b), the engaging portions 26, 27 engage the engaging projections 39 located below the respective shaft pieces (thickness absorbing operation 1 of the floor carpet). Conversely, in case of the floor carpet t3 thicker in thickness than the carpet t1 as shown in FIG. 8(c), the engaging portions 26, 27 engage the engaging projections 39 located above the shaft pieces (thickness absorbing operation 2 of the floor carpet). Namely, especially, since the cylindrical portion 20 at the side of the female member has the lower projection portion 20a extending downwardly from the lower face of the upper flange portion 25, and the engaging portions 26, 27 are formed in the lower projecting portion 20a, this structure is superior in the thickness absorbing operation.

(Structure of the Holding Member) The floor mat mounting holding member 6, as shown in FIGS. 1, 3, and 9(a)-9(d), comprises the lower holding member 4 having a lower flange portion 40, a hole portion 41 penetrated in the center of the lower flange portion 40, and a plurality of engaging pieces 45 provided concentrically outside the hole portion 41 to be spaced apart from each other; and an upper holding member 5 in the male type, having an upper flange portion 50, a hole portion 51 penetrated in the center of the upper flange portion 50 to be able to receive the cylindrical portion 20, a cylindrical portion 55 provided at an undersurface of the upper flange portion and engageable with the engaging piece 45, and a plurality of engaging pieces 52 provided inside the cylindrical portion 55 and engaging the engaging member 21 of the cylindrical portion at the female side. The engaging pieces 45 are inserted into the insertion hole 13 provided in the floor mat 12 disposed on the floor carpet 10 from the lower side of the hole 13, and the cylindrical portion 55 is inserted from the upper portion of the insertion hole 13 to engage the engaging pieces 45, so that the holding member 6 is mounted in the condition that the floor mat 12 is sandwiched between the lower flange portion 40 and the upper flange portion 50. In this structure, the floor mat 12 mounted on the upper surface of the floor carpet is engaged with and fixed by the engagement of the cylindrical portion 20 at the female side and the engaging pieces 52 at the upper holding member.

Figure 9A:
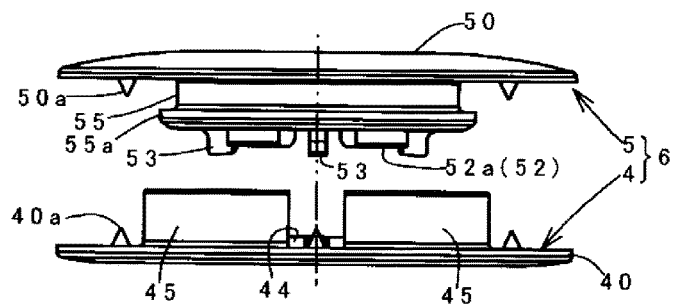
Figure 9B:
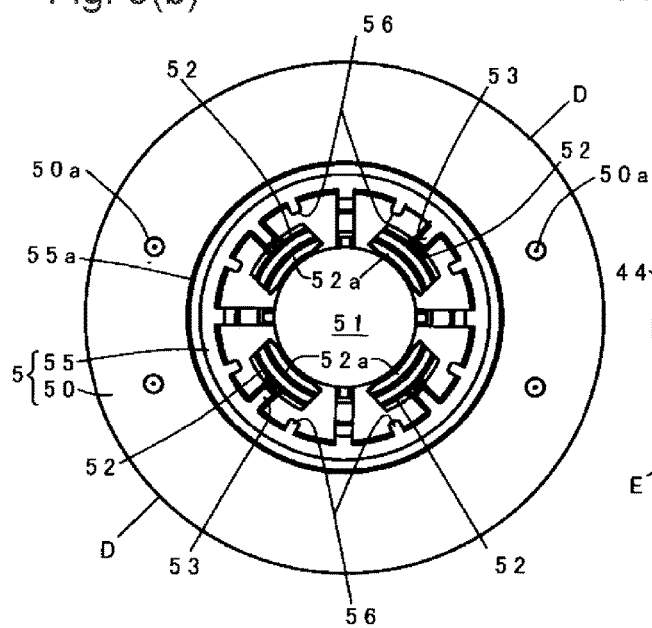
Figure 9C:
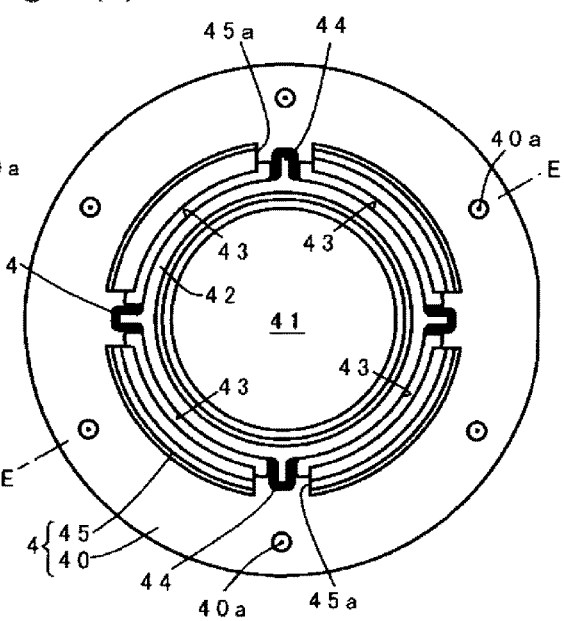
Figure 9D:
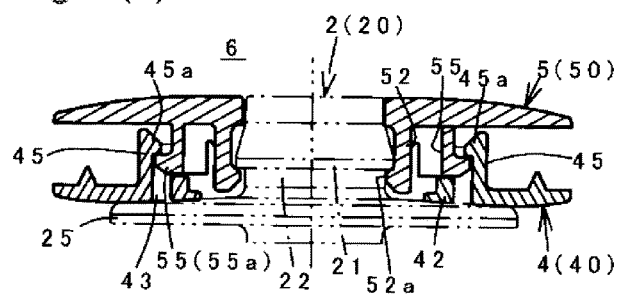

In detail, the lower holding member 4 is integrally formed with the hole member 41 penetrated up and down in the center of the lower flange portion 40 in the disc shape, the plurality of (4 in this embodiment) engaging pieces 45 located on an upper surface of the lower flange portion and projected concentrically with respect to the hole portion 41 with a predetermined interval spaced apart from each other, a circular portion 42 to define an inner diameter of the hole portion 41, which is arranged with respect to the respective engaging pieces 45 through the hole portions 43 and is connected to the flange portion between the engaging pieces 45 through the connecting portions 44, and a plurality of pins 40a located on the upper surface at the peripheral side and projected concentrically. Each engaging piece 45 has a height slightly lower than the thickness of the floor mat 12, and claws 45a project at the inner side of the projecting end, as shown in FIGS. 1 and 9(d).

Also, the upper holding member 5 is integrally formed with a hole member 51 penetrated up and down in the center of the upper flange portion 50 with a shape similar to the lower flange portion 40, a cylindrical portion 55 located at an undersurface of the upper flange portion and projecting concentrically with the hole portion 51, a claw portion 55a projecting outwardly from a projecting end of the cylindrical portion 55 to engage the claws 45a of the engaging pieces

45, a plurality of (4 in this embodiment) engaging pieces 52 located at an inner side of the cylindrical portion and located concentrically with the hole portion 51 to be spaced apart from each other with a predetermined interval, and a plurality of pins 50a located at an undersurface on a periphery side and arranged concentrically. The hole portion 51 is smaller than the hole portion 41. Each engaging piece 52 is set to be slightly longer than the cylindrical portion 55, as shown in FIG. 9(d), and includes a claw 52a projecting inwardly from the projecting end, wherein the claw 52a engages the engaging portion 22 of the cylindrical portion at the female side. In FIGS. 9(a)-9(d), numeral 53 is a rib provided between the cylindrical portion 55 and the engaging piece 52, and numeral 56 is a rib provided at the cylindrical portion 55. These members may be omitted.

(Operation Characteristic of Holding Member) Next, an example of an attachment operation for mounting the holding member 6 to the floor mat is explained.

Figure 4A:
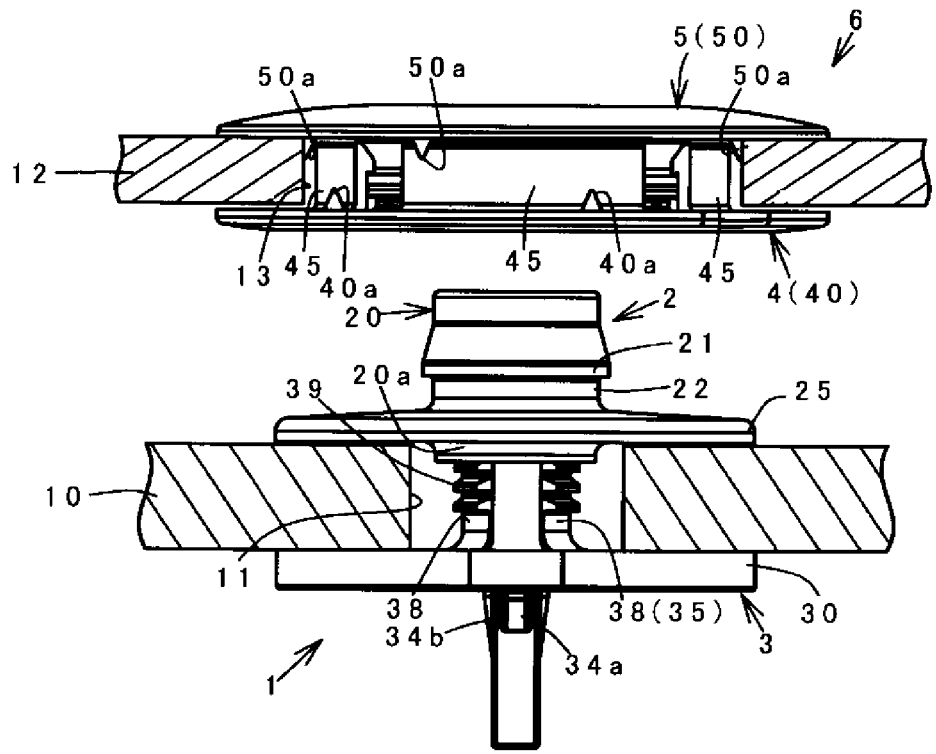
FIGS. 4(a) and 4(b) are a front view and a sectional view, wherein the clip as shown in FIG. 3 is attached to the floor carpet, and the holding member is mounted on the floor mat.
Figure 4B:
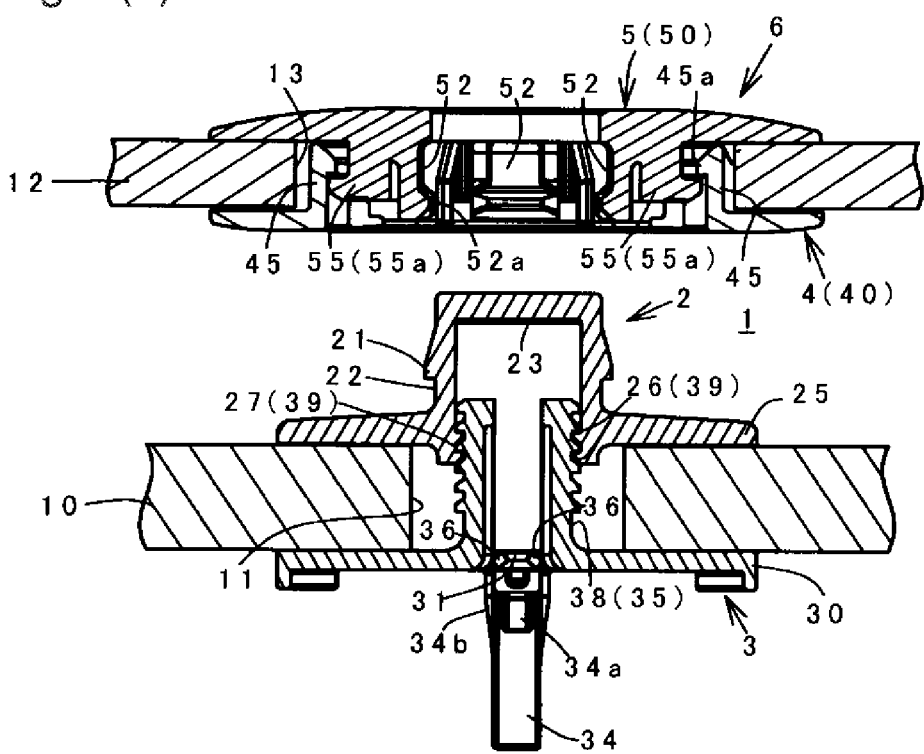

(4) In this attachment operation, for example, as shown in FIG. 3, when the cylindrical portion 55 of the upper holding member 5 is inserted into the insertion hole 13 of the floor mat 12 from the upper side to the lower side, the upper flange portion 50 contacts the upper face of the floor mat 12. Next, while keeping the condition, the lower holding member 4 is arranged to face the upper holding member 5 from the lower side of the floor mat 12, and further placed on the upper holding member 5. Then, the claws 45a of the engaging pieces 45 elastically engage the claws 52a of the corresponding engaging pieces 52. In this engaging structure, in the condition that the floor mat 12 is held by the upper and lower flange portions 50, 40 as shown in FIGS. 4(a) and 4(b), the respective engaging pieces 55 engage the corresponding engaging pieces 45 through the engagements of the claws 55a and the claws 45a, as shown in FIG. 9(d), and by contacting the claws 55a with the corresponding portion of the disc portion 42, the unnecessary movement of the engaging pieces 45 is limited, to thereby keep the stable connecting condition.

(Relation Between the Clip and the Holding Member 6) Next, in order to attach the floor mat to the floor carpet, as shown in FIGS. 4(a), 4(b), 5(a) and 5(b), the connecting structure between the clip and the holding member is explained.

(5) In this structure, from the condition that the clip 1 is mounted on the floor carpet 10, and the holding member 6 is mounted on the floor mat 12, the floor mat 12 is attached to the floor carpet 10 by the engagement of the cylindrical portion of the clip with the engagement pieces 52 at the side of the upper holding member. In this operation, the cylindrical portion 20 is inserted into a space defined by the plurality of engaging pieces 52 of the upper holding member 5. In the middle of insertion, the large diameter portion 21 of the cylindrical portion contacts the claws 52a of the engagement pieces 52, but upon further insertion, the large diameter portion 21 passes over the claws 52a along with the elastic displacement of the engagement pieces 52, and right after passing through, the claws 52a engage with and fixed to the engaging portion 22. Incidentally, in this engagement structure, the regulation member 34 may be inserted to the hole portion 37 from the condition that the engaging portion 22 engages the claws 52a.

Figure 10A:
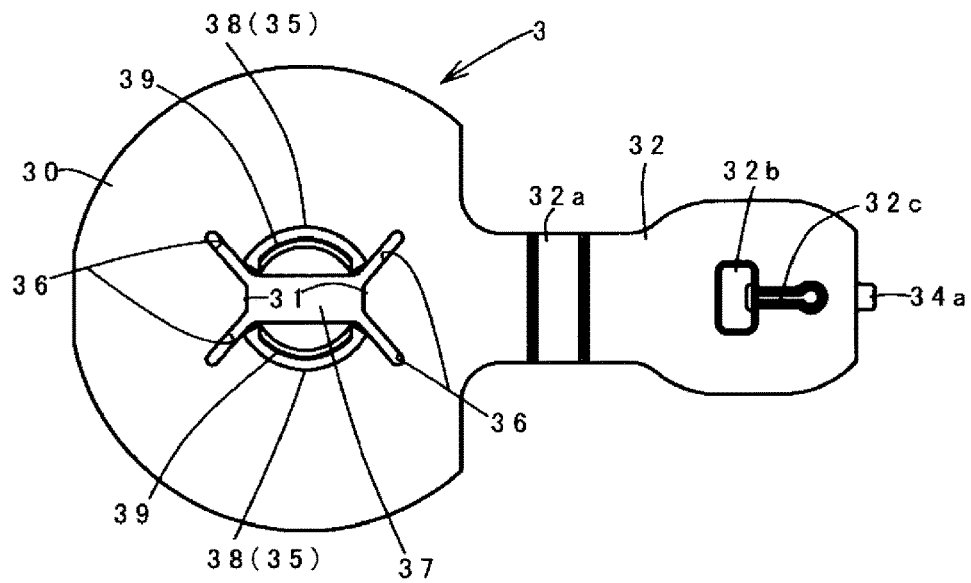
Figure 10B:
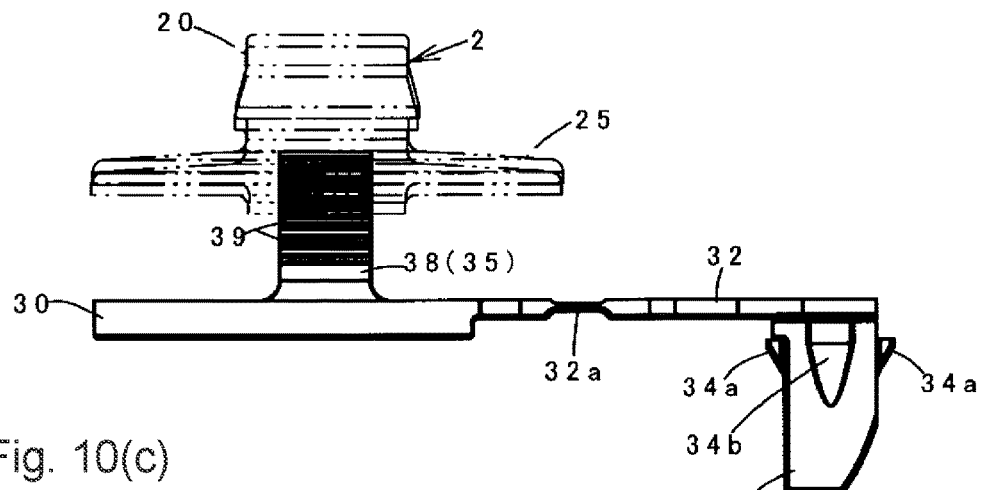
Figure 10C:
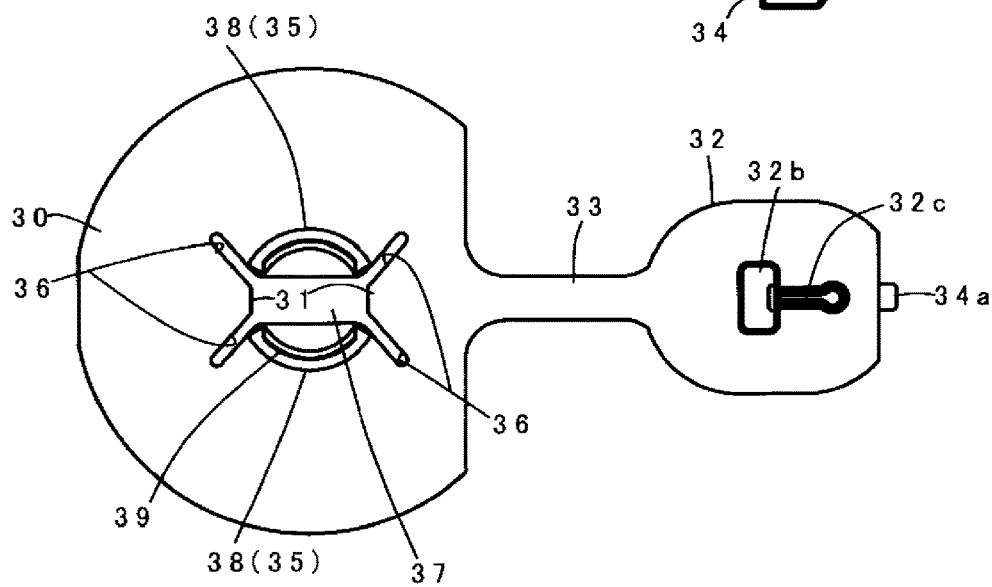
Figure 11A:
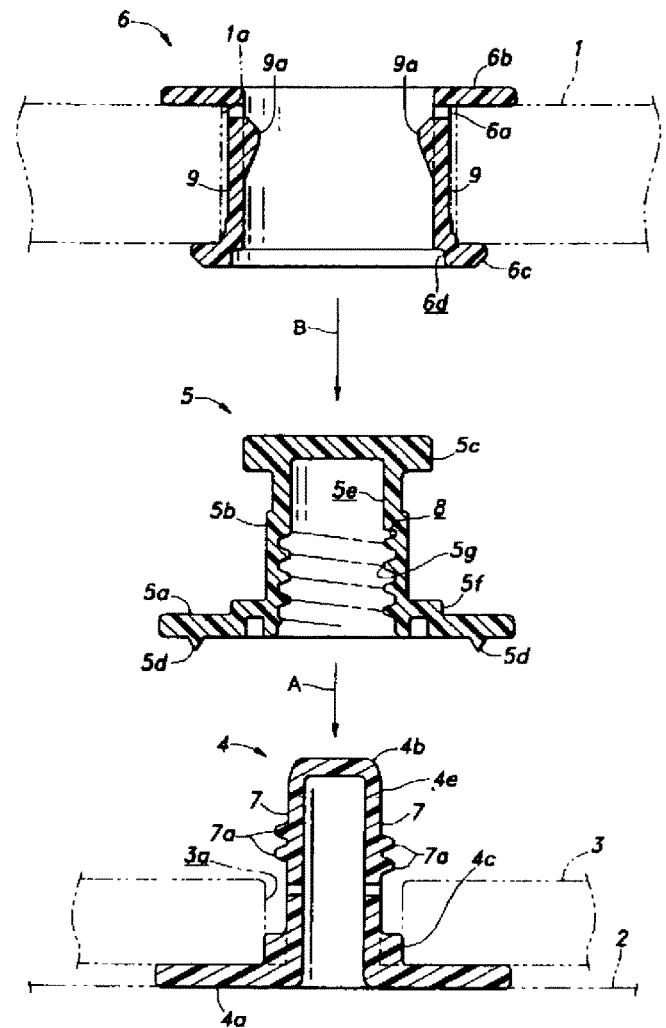
FIGS. 11(a) and 11(b) are explanatory drawings showing FIGS. 3 and 5 of Patent Document 1.
Figure 11B:
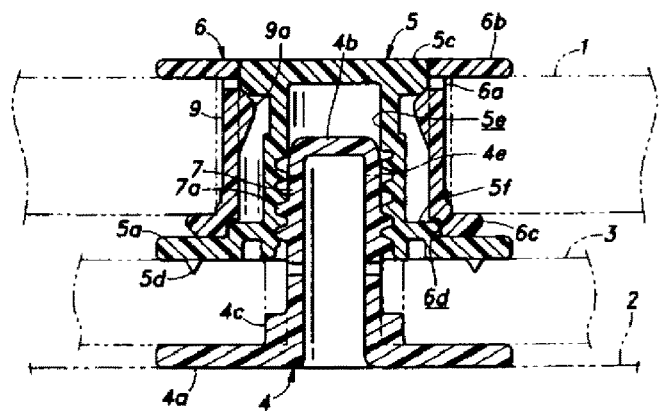

(Modified Example) FIG. 10(c) shows a modified example of a thin hinge 32a of the connecting piece 32 provided between the above regulation member 32 and the lower flange portion 30. In this explanation, the portions same as or similar to the above embodiment are assigned with the same numerals, and the explanation thereof is omitted. Namely, the connecting piece 32 in FIG. 10(c) connects a portion where the regulation member 32 projects and the lower flange portion 30 with a thin connecting piece 33. Since the connecting piece 33 is made thin to be able to bend, it is made light as compared with the thin hinge. Incidentally, even if the regulating member is made separately from the male member 3, it is functionally good.

As explained above, the present invention is sufficient if the structure defined in the claims is provided, and the detailed structure may be changed as necessity as shown in the modified example. Also, as products fixed by the clip for the floor carpet attachment, it is not limited to the floor mat, for example, a foot rest and other decoration materials arranged on the floor carpet, such as disclosed in Japanese Patent Publication No. 2002-193017.

The disclosure of Japanese Patent Application No. 2020-050559 filed on Mar. 23, 2020 is incorporated herein.

EXPLANATION OF NUMERALS

1: Clip for attachment of a flor carpet
2: Female member
3: Male member
4: Lower holding member
5: Upper holding member
6: Holding member for a floor mat
10: Floor carpet (11: insertion hole)
12: Floor mat (article)
13: Floor carpet (14: Insertion hole)
15: Floor carpet (16: Insertion hole)
20: Cylindrical portion of the male member (20a: Lower projecting portion)
22: Engagement portion (21: Large diameter portion)
25: Upper flange portion of a female member
26: Engaging portion in a mounting shape
27: Engaging portion in a dent shape
30: Lower flange portion of a male member
31: Engaging portion
32: Connection piece (32a: Thin hinge)
33: Bendable connecting piece
34: Regulation member (34a: Claw)
35: Shaft portion of male member
36: Slit
37: Hole portion
38: Shaft piece
39: Engagement projection
40: Lower flange portion of a lower holding member (41: Hole portion)
45: Engagement piece of a lower holding member (45a: Claw)
50: Upper flange portion of an upper holding member (51: Hole portion)
52: Engagement piece of the upper holding member (52a: Claw)
55: Cylindrical portion of the upper holding member (52a: Claw)

What is claimed is:

1. A clip for attachment of a floor carpet, comprising:
a male member having a lower flange portion, and a shaft portion projecting from an upper surface of the lower flange portion, and
a female member having a cylindrical portion to which the shaft portion is inserted, and an upper flange portion projecting around an outer periphery of the cylindrical portion,
wherein the clip is configured to be attached to the floor carpet held between the lower flange portion and the upper flange portion by inserting the shaft portion to an insertion hole formed in the floor carpet from a hole lower side to a hole upper side and engaging the shaft portion penetrating through the insertion hole with the cylindrical portion so that an article mounted on an upper surface of the floor carpet is fixed by the cylindrical portion of the male member, the female member includes an engaging portion at an inner periphery of the cylindrical portion, and the male member includes a hole portion penetrating through the lower flange portion and the cylindrical portion in an axial direction, engaging projections formed around an outer periphery of the shaft portion to project therefrom, a regulation member to be inserted into the hole portion, and a hinge bendably connecting the regulation member to the lower flange portion, said regulation member, when the male member is inserted into the female member to engage the engaging projections with the engaging portion and the regulation member is inserted into the hole portion, preventing the engaging projections from being disengaged from the engaging portion.

2. A clip according to claim 1, wherein the shaft portion of the male member includes a plurality of divided shaft pieces divided by the shaft portion.

3. A clip according to claim 1, wherein the regulation member includes a claw engaging an engaging portion formed at the lower flange portion of the male member.

4. A clip according to claim 1, wherein the shaft portion of the male member includes the engaging projections arranged in the shaft direction, and the cylindrical portion of the female member includes a lower projecting portion projecting downwardly from a lower surface of the lower flange portion and having the engaging portion on an inner periphery thereof.

5. A clip for attachment of a floor carpet, comprising:

a male member having a lower flange portion, and a shaft portion projecting from an upper surface of the lower flange portion, and a female member having a cylindrical portion to which the shaft portion is inserted, and an upper flange portion projecting around an outer periphery of the cylindrical portion, wherein the clip is configured to be attached to the floor carpet held between the lower flange portion and the upper flange portion by inserting the shaft portion to an insertion hole formed in the floor carpet from a hole lower side to a hole upper side and engaging the shaft portion penetrating through the insertion hole with the cylindrical portion so that an article mounted on an upper surface of the floor carpet is fixed by the cylindrical portion of the male member, the female member includes an engaging portion at an inner periphery of the cylindrical portion, and the male member includes a hole portion penetrating through the lower flange portion and the cylindrical portion in an axial direction, engaging projections formed around an outer periphery of the shaft portion to project therefrom, a regulation member to be inserted into the hole portion, and a connecting piece bendably connecting the regulation member to the lower flange portion, said regulation member, when the male member is inserted into the female member to engage the engaging projections with the engaging portion and the regulation member is inserted into the hole portion, preventing the engaging projections from being disengaged from the engaging portion.

6. A clip for attachment of a floor carpet, comprising:

a male member having a lower flange portion, and a shaft portion projecting from an upper surface of the lower flange portion, and a female member having a cylindrical portion to which the shaft portion is inserted, and an upper flange portion projecting around an outer periphery of the cylindrical portion, wherein the clip is configured to be attached to the floor carpet held between the lower flange portion and the upper flange portion by inserting the shaft portion to an insertion hole formed in the floor carpet from a hole lower side to a hole upper side and engaging the shaft portion penetrating through the insertion hole with the cylindrical portion so that an article mounted on an upper surface of the floor carpet is fixed by the cylindrical portion of the male member, the female member includes an engaging portion at an inner periphery of the cylindrical portion, and the male member includes a hole portion penetrating through the lower flange portion and the cylindrical portion in an axial direction, engaging projections formed around an outer periphery of the shaft portion to project therefrom, and a regulation member to be inserted into the hole portion and having a claw engaging an engaging portion formed at the lower flange portion of the male member and defined by an edge portion of the hole portion and a plurality of slits extending from the hole portion, said regulation member, when the male member is inserted into the female member to engage the engaging projections with the engaging portion and the regulation member is inserted into the hole portion, preventing the engaging projections from being disengaged from the engaging portion.

* * * * *